Oct. 31, 1961
L. C. CLONINGER ET AL
3,006,830
METHOD FOR IMPROVING THE DYEABILITY OF
FIBER-FORMING CELLULOSE ESTERS
Filed May 31, 1957
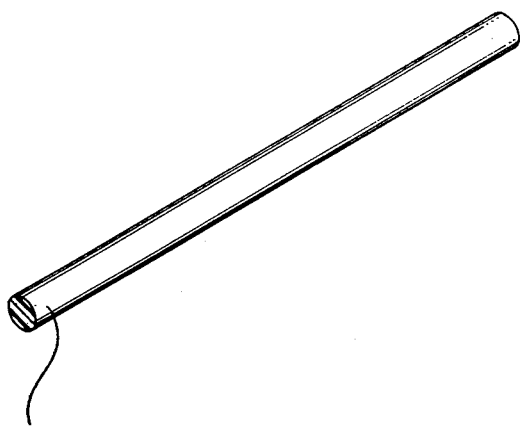
Filamentary shaped article of a
composition comprising a fiber-
forming cellulose ester substrate
having attached thereto a sul-
fonated alkenyl aromatic graft
copolymer.
INVENTORS
Lamar C. Cloninger
Frederick M. Arnesen
BY
Griswold & Burdick
ATTORNEYS

Patent 3,006,830 — Oct. 31, 1961

3,006,830
METHOD FOR IMPROVING THE DYEABILITY OF FIBER-FORMING CELLULOSE ESTERS

Lamar C. Cloninger, Midland, and Frederick M. Arnesen, Bay City, Mich., assignors to The Dow Chemical Company, Midland, Mich., a corporation of Delaware
Filed May 31, 1957, Ser. No. 662,903
9 Claims. (Cl. 204—154)

When conventional dyeing procedures are employed, the conventionally available types of cellulose acetate and other cellulose esters of the fiber-forming variety, including cellulose propionate, cellulose butyrate and the like and mixtures thereof can only be dyed with the type of dyestuffs or coloring agents that are of the dispersed acetate class of material. It would be an advantage to enhance the dye-receptivity of fiber-forming cellulose acetate and the like cellulose ester composition in order to render them susceptible to being easily and satisfactorily colored with a greater diversity of dyestuffs and coloring agents.

The chief aim and concern of the present invention, therefore, is to provide an improved and highly effective method for increasing the dyeability of various shaped or preformed articles, particularly filamentous structures of various fiber-forming cellulose esters, especially cellulose acetate, to permit their being readily dyed, particularly by acid and direct types of dyestuffs. The invention also relates and has for an object the provision of fiber-forming cellulose ester compositions, particular cellulose acetate compositions, having pronounced receptivity of the indicated and other varities of dyestuffs in addition to those that belong to the dispersed acetate class.

According to the present invention, a shaped article, particularly a filamentary shaped or preformed article, of fiber-forming cellulose acetate or other of the fiber-forming cellulose esters may advantageously be treated for improvement of its dyeability without appreciably altering or deleteriously influencing the physical properties of the cellulose ester by a method which comprises first thoroughly impregnating at least the surface of the shaped article being treated with a sulfonated alkenyl aromatic monomer (as, for example, with a sulfonated styrene monomer such as styrene sulfonic acid or its salts) then subsequently exposing the intimately mixed cellulose substrate and sulfonated monomer impregnant thereof to a field of high energy radiation to efficiently provide an effectively attached graft copolymer of the polymerized sulfonated alkenyl aromatic monomeric impregnant on the cellulose ester substrate. The resulting product is generally found to be readily and easily dyeable to deep and level shades of coloration using acid and direct types of dyestuffs while employing conventional techniques for their application. In addition, the graft copolymer modified product of the invention is oftentimes found to also be quite readily dyeable with other varieties of dyestuffs that conventional cellulose esters do not normally accept to any pronounced degree, such as the vat, sulphur and napthol types of dyes. The desirable physical properties and characteristics of the cellulose ester substrate are not adversely affected by treatment or modification in accordance with the present invention. In many cases, the modified cellulose ester substrate of the present invention, especially when it is dyed with either acid or direct type colors, may be found to have superior fastness properties to an unmodified cellulose acetate or other fiber-forming cellulose ester that has been dyed according to conventional procedures with a dispersed acetate type of dyestuff. An improved filamentary cellulose ester article that has been modified in accordance with the present invention is schematically illustrated in the sole figure of the hereto annexed drawing.

The quantity of sulfonated alkenyl aromatic monomer that is intimately impregnated in the cellulose ester substrate for the high energy radiation-induced graft copolymerization therewith may not only depend upon the specific nature and characteristics of the particular substrate that is intended to be modified as well as the particular graft copolymerizing efficiency of the sulfonated monomeric impregnant that is involved, but also upon the degree of modification that may be desired to be imparted in the resulting composition. Generally, the quantity of the monomer that is employed should be adequate to secure the desired enhancement of the dyeability or dye-receptivity of the cellulose ester substrate to acid and direct type of dyestuffs.

Ordinarily a satisfactory result may be achieved when minor proportions of the sulfonated monomer are thoroughly impregnated in the polymer substrate that is intended to be modified. In some instances, very minor proportions may suffice, especially when low levels of acid and direct type dye-attracting improvement are satisfactory for a particular purpose at hand. Broadly speaking, it is desirable to employ such a quantity of the monomer that may be adapted to provide an average of between about 1 and 30 percent by weight of grafted dye-receptive polymerized sulfonated monomer on the cellulose ester chain that is desired to be modified. To the attainment of such ends, it may frequently be found advantageous to impregnate in or to incorporate with the cellulose ester substrate an amount of the sulfonated monomeric impregnant that is between about 1 and 75 percent by weight, based on the weight of the cellulose ester substrate. In some cases it may be necessary to achieve relatively higher impregnated quantities of the sulfonated monomer in a plurality of successive impregnating steps or treatments. An amount of the sulfonated monomer that is between about 1 and 30 percent by weight may be even more advantageous for most purposes within the contemplation of the present invention. This is for the reason that the relatively greater receptivity to acid and direct types of dyes that may be obtained by utilization of greater relative proportions of the monomer is frequently unnecessary for practical purposes. In this connection, as has been indicated, it is most desirable for as large a proportion as possible (preferably all or substantially all) of the sulfonated monomer to result in a graft copolymer that is firmly attached to the cellulose ester substrate. Thus, it is beneficial for the application of the radiation to be continued until from 1 to 30 percent by weight and preferably from 1 to 15 percent by weight (which is more than adequate for most practical purposes), of the graft copolymer is obtained on the cellulose ester substrate (based on the weight of the latter) to insure the desired increase in specific dye-receptivity.

The sulfonated alkenyl aromatic monomer may be intimately impregnated in or incorporated with the cellulose ester substrate in any desired manner prior to mutual irradiation of the associated, graft copolymerizable mixture. Thus, the monomer may be directly applied to or mixed or blended with the cellulose ester substrate or it may be applied from dispersion or solution in suitable liquid vehicles until a desired monomer content has been obtained. In many instances it may be an advantage to apply the monomer from aqueous solution having a concentration that is at or near saturation. In this connection, the cellulose ester substrate may be modified while it is in either a fabricated or unfabricated condition. Usually, however, it is more expedient to modify already fabricated shaped articles of the substrate such as filaments, fibers, films or other shaped or molded structures.

The sulfonated alkenyl aromatic monomers that may be employed in the practice of the present invention are of the type having the general formula:

$$CH_2=CR-Ar-(CH_2)_n-SO_3X$$

wherein R is selected from the group consisting of hydrogen and methyl, Ar is an aromatic radical (including nuclear substituted aromatic radicals) containing from 6 to 10 carbon atoms, $n$ has a value of 0 and 1 and X is selected from the group consisting of hydrogen and alkali metals. Advantageously, the sulfonated alkenyl aromatic monomer is arranged with the sulfonate substituent in a position that is para to the alkenyl group. Sulfonated alkenyl aromatic monomers that may be employed suitably in the practice of the invention include sulfonated styrene monomers, sulfonated vinyl toluene monomers, sulfonated vinyl xylene monomers, sulfonated vinyl naphthalene monomers and vinyl benzyl sulfonates. Preferably, as indicated, sodium styrene sulfonate or styrene sulfonic acid are employed as the sulfonated alkenyl aromatic monomers in the practice of the present invention.

The high energy radiation which is utilized for inducing the graft copolymerization in the sulfonated monomer/cellulose ester mixtures is of the type which provides emitted particles or photons having an intrinsic energy of a magnitude which is greater than the planetary electron binding energies which occur in the graft copolymerizable mixture or combination of materials. Such high energy radiation is conveniently available from various radioactive substances which provide beta or gamma radiation as, for example, radioactive cobalt, nuclear reaction fission products and the like. If it is preferred, however, high energy radiation from such sources as electron beam generators, X-ray generators and the like may also be utilized. It is beneficial to employ the high energy radiation in a field of at least about 40,000 roentgens per hour (or equivalent ionizing potency) intensity. A roentgen, as is commonly understood, is the amount of high energy radiation as may be provided in a radiation field which produces in one cubic centimeter of air at a temperature of 0° C. under 760 millimeters of absolute mercury pressure such a degree of conductivity that one electrostatic unit of charge is measured at saturation (when the secondary electrons are fully utilized and the wall effect of the chamber is avoided).

It is most desirable to graft copolymerize all of the sulfonated monomeric impregnant to and with the cellulose ester substrate while the mixture is being subjected to the influence of the mutual high energy radiation. Room temperatures may be employed satisfactorily for irradiation although elevated temperatures may also be utilized. The preferred radiation dosage in million roentgen equivalent physicals (mrep.) that is employed is in an amount or quantity that is adapted to quickly accomplish the graft copolymerization without deleteriously influencing or degrading the cellulose ester substrate. Generally, a radiation dosage between, say, about 0.25 and 10 mrep. may be satisfactorily employed. Oftentimes it may be more advantageous when the dosage that is utilized for affecting the desired graft copolymerization is between about 0.5 and 5 mrep. Obviously, the greatest economy and advantage may be achieved when minimum high energy radiation dosages are involved. Greatly excessive dosages should be assiduously avoided to avoid degradation of the reactants, especially after all or substantially all of the sulfonated alkenyl aromatic monomer has become graft copolymerized to the cellulose ether substrate. After the radiation-induced graft copolymerization has been completely accomplished, it may oftentimes be desired to scour or otherwise purify the modified cellulose ester product in order to ensure the removal therefrom of any residual unreacted monomer (or even loosely associated polymer of the sulfonated monomer) that may not have entered into chemical combination with the substrate under influence of the high energy irradiation.

In order to further illustrate the invention, about a 15 gram sample (on a dry weight basis) of a spun cellulose acetate yarn of about 242 denier was wound on a glass test tube having an outside diameter of about 1.8 centimeters. The wound yarn sample was then inserted in a larger test tube which contained an adequate quantity of a 10 percent by weight aqueous solution of sodium styrene sulfonate to cover the yarn. The yarn was maintained in the solution until it had absorbed about 14.5 percent by weight of the sulfonated monomer, based on the dry weight of the yarn. While in the solution, the sample was exposed at room temperature to a field of high energy radiation that was emitted from a cobalt 60 source until a total dosage of about 4 mreps. had been effected. The modified yarn was then scoured (using an aqueous scouring solution in the conventional manner of about 0.5 percent by weight, based on the weight of the fiber, of a commonly employed anionic detergent) for 30 minutes at a temperature of about 160° F. After having been scoured, the yarn was dyed in an aqueous dyebath that contained 2 percent by weight (based on the weight of the fiber) of well dissolved Wool Fast Blue BLA (an acid type dyestuff), 20 percent by weight of Glauber's salt, and 5 percent by weight of acetic acid (28 percent strength) having a liquor to fiber ratio of about 30:1. The yarn was admitted to the dyebath at a temperature of about 100° F., after which the temperature of the bath was raised to 195–200° F. and maintained at the elevated temperature for 45 minutes. After having been dyed, the yarn was removed from the dye bath, rinsed well with warm water and subsequently scoured for 15 minutes in the above-indicated manner. It was found to have been become dyed to a deep and level shade of blue. The graft copolymerized fiber was found to have picked up about 11.8 percent by weight of the grafted copolymer, based on its unmodified weight. The treated yarn had a tenacity of about 0.70 gram per denier and an elongation of about 12 percent.

For purposes of contrast with the foregoing, an unmodified sample of the same cellulose acetate yarn (which had a tenacity of about 0.75 gram per denier and an elongation of about 8.8 percent) was attempted to be dyed in the same manner as above described. The unmodified yarn was only stained to a very pale, relatively streaked, blue shade of coloration. For purposes of additional comparison, when a sample of the same cellulose acetate yarn was subjected to the same high energy dosage without being immersed in the sulfonated monomer solution, its tenacity (after irradiation) was found to have been diminished to about 0.51 gram per denier and its elongation to about 7.8 percent.

Similar excellent results were also obtained when the foregoing procedure was repeated, excepting to replace the sodium styrene sulfonate monomer with the free acid form of the monomer and with sodium vinyl benzyl sulfonate and to dye the graft copolymer modified yarn with such dyestuffs as are listed in the following tabulation, in which the color index (or American Prototype No., where appropriate) is given along with the identity of the manufacturer of each of the dyestuffs.

ACID DYES

| Name | Color Index (CI) | Manufacturer |
| --- | --- | --- |
| Acid Orange XX-Cf | 151 | GDC.b |
| Alizarine Cyanine Green GHN | 1,078 | GDC.b |
| Azo Phloxine GA | 31 | GDC.b |
| Chinoline Yellow D Conc | 801 | GDC.b |
| Fast Red ALS | 176 | GDC.b |
| Supranol Red PRX-CF | 430 | GDC.b |
| Calcocid Eosine G | 114 | CCC.c |
| Calcocid Fast Black B | 307 | CCC.c |
| Calcocid Orange RR | 161 | CCC.c |
| Calcocid Scarlet MOON | 252 | CCC.c |
| Calcocid Yellow MCG | 640 | CCC.c |
| Naphthol Yellow S Conc | 10 | Ciba.d |
| Lanosol Blue B Conc | 1,054 | Ciba.d |

DIRECT DYES

| Name | CI | Company |
|---|---|---|
| Diamine Fast Red FA-Cf | 419 | GDC.[b] |
| Diamine Scarlet 3BA-CF | 382 | GDC.[b] |
| Fastusol Blue LR | [a] Pr. 443 | GDC.[b] |
| Calcomine Azurine BT Conc | 502 | CCC.[c] |
| Benzo Green CA-CF | 593 | GDC.[b] |
| Fastusol Yellow RA Extra | 349a | GDC.[b] |
| Calcodur Orange EGL | [a] Pr. 72 | CCC.[c] |
| Calcodur Yellow BL Conc | 814 | CCC.[c] |
| Calcomine Blue R Conc | [a] Pr. 22 | CCC.[c] |
| Calcomine Chrome Brown BS | [a] Pr. 21 | CCC.[c] |
| Pontamine Violet N Conc. 150 percent | 394 | Du Pont.[e] |
| Benzo Fast Scarlet GSA-CF | 326 | GDC.[b] |

[a] Indicates Prototype designation.
[b] General Dyestuff Corporation.
[c] American Cyanamid Company.
[d] Ciba Company, Inc.
[e] E.I. du Pont de Nemours & Co., Inc.

Good results may also be obtained when the salt or free acid forms of sulfonated vinyl toluene, sulfonated vinyl xylene and sulfonated vinyl napthaline monomers are employed in ways analogous to that illustrated with sulfonated styrene monomer in the practice of the present invention.

What is claimed is:

1. A method for improving the receptivity to direct and acid type dyestuffs of shaped articles of fiber-forming cellulose esters which comprises thoroughly impregnating at least the surface of the shaped article with between about 1 and about 75 weight percent, based on the weight of the cellulose ester substrate, of a sulfonated alkenyl aromatic monomer compound of the structure:

$$CH_2=CR-Ar-(CH_2)_n-SO_3X$$

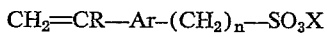

wherein R is selected from the group consisting of hydrogen and methyl, Ar is an aromatic radical having from 6 to 10 carbon atoms, $n$ has a value of 0 or 1, and X is selected from the group consisting of hydrogen and alkali metals; then subsequently exposing the intimately mixed cellulose ester substrate and sulfonated monomer impregnant thereof to a field of high energy radiation having a minimum intensity of about 40,000 roentgens per hour which is applied until a dosage between about 0.25 and 10 mreps. is effected and at least a portion of the sulfonated monomer graft copolymerizes with the cellulose ester substrate.

2. The method of claim 1, wherein the shaped article is a filamentary shaped article.

3. The method of claim 1, wherein the field of high energy irradiation has a minimum intensity of about 40,000 roentgens per hour and is applied until a dosage between about 0.5 and 5 mreps. is effected.

4. The method of claim 1, wherein between about 1 and 30 percent by weight of the sulfonated monomer, based on the weight of the cellulose ester substrate, is impregnated in said substrate.

5. A method according to the method set forth in claim 4, wherein the irradiation is continued until from 1 to 15 percent by weight of said monomer impregnant is chemically attached to said cellulose ester substrate as dye-receptive graft copolymer pendages.

6. The method of claim 1, wherein said cellulose ester substrate is cellulose acetate.

7. The method of claim 1, wherein said sulfonated alkenyl aromatic monomer is a sulfonated styrene monomer.

8. The method of claim 1, wherein said sulfonated alkenyl aromatic monomer is a vinyl benzyl sulfonate monomer.

9. The method of claim 1, wherein said sulfonated alkenyl aromatic monomer is a sulfonated vinyl toluene monomer.

References Cited in the file of this patent

UNITED STATES PATENTS

| | | |
|---|---|---|
| 2,053,819 | Felix et al. | Sept. 8, 1936 |
| 2,104,722 | Bertsch | Jan. 11, 1938 |
| 2,654,716 | Sorenson | Oct. 6, 1953 |
| 2,666,025 | Nozaki | Jan. 12, 1954 |
| 2,681,846 | Guthrie et al. | June 22, 1954 |
| 2,763,609 | Lewis et al. | Sept. 18, 1956 |
| 2,789,030 | Fetscher | Apr. 16, 1957 |
| 2,830,943 | Mackenzie | Apr. 15, 1958 |
| 2,839,479 | Caldwell et al. | June 17, 1958 |

FOREIGN PATENTS

| | | |
|---|---|---|
| 1,130,100 | France | Sept. 17, 1956 |
| 1,079,401 | France | Dec. 12, 1955 |
| (4th Addition of No. 66,034) | | |
| 1,079,401 | France | May 19, 1954 |
| 750,923 | Great Britain | June 20, 1956 |

OTHER REFERENCES

Chen et al.: "J. Poly. Sci." vol. 23, pages 903–913, Feb. 1957.

Pinner et al.: "Plastics," pages 27–30, Jan. 1958.

Brookhaven National Laboratory Report No. 414, pp. 1–14, Oct. 1956.

Ballantine: "Modern Plastics," pp. 171–176, Sept. 1957.

Quarterly Progress Report B.N.L. 367, cover, 27, 28, July 1–Sept. 30, 1955, Brookhaven National Laboratory.